(12) United States Patent
Korcharz et al.

(10) Patent No.: US 7,225,345 B2
(45) Date of Patent: May 29, 2007

(54) EMPLOYING SENSE RESISTOR AS SAFETY FUSE IN LIMITED POWER SOURCE APPLICATIONS

(75) Inventors: Dror Korcharz, Bat Yam (IL); Arkadiy Peker, New Hyde Park, NY (US); Yaniv Giat, Sde Ilan (IL)

(73) Assignee: PowerDsine, Ltd., Hod Hasharon (IL)

( * ) Notice: Subject to any disclaimer, the term of this patent is extended or adjusted under 35 U.S.C. 154(b) by 234 days.

(21) Appl. No.: 10/440,565

(22) Filed: May 19, 2003

(65) Prior Publication Data

US 2004/0236967 A1     Nov. 25, 2004

(51) Int. Cl.
*G06F 1/26* (2006.01)
*H02H 3/20* (2006.01)
(52) U.S. Cl. .................. 713/300; 361/91.2
(58) Field of Classification Search ............ 713/300; 361/91.2
See application file for complete search history.

(56) References Cited

U.S. PATENT DOCUMENTS

| | | | | |
|---|---|---|---|---|
| 5,392,349 A | * | 2/1995 | Elder, Jr. ................... | 379/412 |
| 6,326,733 B1 | * | 12/2001 | Schweickardt, Jr. ........ | 315/119 |
| 6,356,496 B1 | * | 3/2002 | Carroll et al. ............ | 365/225.7 |
| 6,424,035 B1 | * | 7/2002 | Sapp et al. ................ | 257/723 |
| 6,462,766 B1 | * | 10/2002 | Roeber et al. ............. | 347/190 |
| 6,700,161 B2 | * | 3/2004 | Hsu et al. .................. | 257/358 |

* cited by examiner

*Primary Examiner*—Lynne H. Browne
*Assistant Examiner*—Eric Chang
(74) *Attorney, Agent, or Firm*—Simon Kahn

(57) ABSTRACT

A communication network utilizing Power Over Ethernet technology including Power Sourcing Equipment (PSE) that includes a multi-purpose device that operates as a current sensing resistor under normal electrical operating conditions and operates as a protection device, e.g., a fuse, under fault conditions, such as, an internal switch failure and an overload occurring simultaneously.

26 Claims, 2 Drawing Sheets

EMPLOYING SENSE RESISTOR AS SAFETY FUSE IN LIMITED POWER SOURCE APPLICATIONS

FIELD OF THE INVENTION

The present invention relates generally to data communication power distribution and delivery systems. More particularly, the invention is directed to apparatuses and methods for supplying power over standard cabling in a local area network, for example, 'Power Over LAN' (a trademark of PowerDsine Ltd. Corporation, Israel), or 'Power Over Ethernet' (POE), to data communication devices, such as, IP telephones (VoIP), Wireless Access Points (AP), cellular telephone charging stations, etc.

BACKGROUND OF THE INVENTION

POE is a revolutionary technology that integrates data, voice and power over standard Ethernet infrastructure. POE is a means for supplying reliable, uninterrupted power to Internet Protocol (IP) telephones, wireless LAN access points, network cameras and other Ethernet devices, using existing, commonly used network cable infrastructure. POE technology saves time and expense related to the installation of separate power cabling, AC outlets and 'wall warts', which is a term used in the industry referring to a transformer, or power supply, that plugs into a wall outlet for converting the AC power from the outlet into DC power for an electronic device, such as a modem or a charging station for a laptop computer, etc. POE also eliminates the need for a dedicated Uninterruptible Power Supply (UPS) for individual devices.

The power delivered over the Ethernet infrastructure is automatically activated when a compatible terminal is identified, and blocked to devices that are not POE compatible. This feature allows users to freely and safely mix both POE-compatible and non-POE-compatible devices on their network.

POE devices typically comply with the IEEE802.3af standard. The IEEE802.3af standard is presently a draft standard that will ultimately be incorporated within IEEE 802.3. The technology driving IEEE802.3af is designed in a way that does not degrade the network data communication performance or decrease the network reach. POE devices include, among other things, Power Sourcing Equipment (PSE) and Powered Devices (PDs).

There are two main implementations of POE: (1) The end-span PSE—A POE enabled Ethernet switch by which power is supplied directly from the data ports; and (2) The mid-span PSE—A patch-panel like device, residing between an ordinary Ethernet switch and the terminals, often referred to as a "Power Hub", by which power is added onto the spare wires, with data uninterrupted. A PD in compliance with IEEE 802.3af receives its power from either the end-span device, i.e., over the data lines, or from a mid-span device, i.e., over the spare wires.

A portion of a PSE includes a mixed signal control section 10 and a power section 20, as shown in FIG. 1. The power section 20 typically includes a power switch 21, a protective device 22 and a current sensing device 23. The power switch can be implemented by a MOSFET, a bipolar transistor, a relay, etc. The protective device can be a fuse, an electromechanical circuit breaker or a positive temperature coefficient (PTC) device. Lastly, the current sensing device is typically implemented by a low ohmic-value resistor.

The power switch 21 controls the amount of current supplied to the load, or PD, based on information from the current sensing device 23 or, in the case of a current sensing resistor, by measuring voltage across this resistor. The power switch 21 can also perform a protective function, for example, by first limiting the current drawn by the load and then, ultimately, disconnecting the load under abnormal conditions, such as an overload or short circuit. Additionally, in conventional POE equipment, a protective device, such as a fuse, protects the internal circuitry and wiring of the POE equipment from an overload or short circuit condition in the event of a short circuit catastrophic failure of the power switch in conjunction with an overload condition in either or both of the PD circuitry and the cabling 30 connected to the PD.

UL 60950 is a safety standard written by Underwriters Laboratories (UL), a private company that drafts standards for use in certifying product safety in the U.S. and also independently tests products to verify compliance with those standards. UL 60950 is entitled "Safety of Information Technology Equipment, Including Electrical Business Equipment" and is harmonized to the international standard IEC 60950 with the same title. A European version of the UL 60950 standard also exists as EN60950, as does other international standards corresponding to various countries. All of these standards, and at least all of the related 60950 standards, are hereby incorporated by reference for all that they teach. Additionally, although the UL 60950 standard is specifically referenced throughout the remainder of this disclosure, all other related 60950 standards are equally applicable.

According to UL 60950 and the general POE standard published by the IEEE (IEEE802.3af), which is also incorporated hereby by reference for all that it teaches, POE devices must comply with the safety requirements of so-called limited power sources (LPS). These safety industry standards specify the requirements for the maximum allowable electrical current and power output from the LPS device. Specifically, the standards specify the maximum allowable output current and power measured sixty (60) seconds after the application of any non-capacitive load, including a short circuit. In regard to POE devices with an output voltage of 50V, the maximum output current with any non-capacitive load applied, measured sixty (60) seconds after application of the load, must not exceed two (2) amperes (A) current or 100 volt-amps (VA) power.

In addition to the several safety standards mentioned above, the U.S. Department of Labor's Occupational Safety and Health Administration (OSHA) regulations require that all electrical equipment used in industrial settings be approved by product safety standards. Moreover, "approved" means that the equipment has been tested and verified to generally accepted UL or American National Standards Institute (ANSI) testing standards. Thus, adherence to UL 60950 and similar standards is very important, as is providing a cost-effective design for POE equipment.

OBJECTS OF THE INVENTION

In consideration of the issues raised above in regard to safety standard-compliant POE equipment, one object of the present invention is to provide a design for a POE system that both complies with safety standards, such as UL 60950 and its related counterparts mentioned previously, and also reduces costs associated with manufacturing the system.

SUMMARY OF THE INVENTION

A POE system in accordance with one embodiment of the invention effectively removes the conventional protective device, such as a fuse, found in conventional POE circuits, and combines the protective function and current sensing function in a single multi-purpose element device. For example, the single multi-purpose element could be the general purpose current sense resistor 53, as shown in FIG. 2. Alternatively, the protective function and current sense function could be delegated to separate devices. For example, a fuse can be implemented for carrying out the protective function only while the current sensing function is performed by a resistor or some other sensor.

Proper design of a current sense resistor used in relation to the POE ports of the PSE of the POE equipment provides the necessary protection to comply with safety standards for LPS and is also a very cost-effective prospect. One embodiment of the invention includes a current sense resistor that operates safely under normal conditions and exhibits infinite (e.g., open circuit) or very high impedance under abnormal operating conditions, such as a short circuit, or a failure of the power switch combined with an overload of the PD circuitry or the PD cabling.

The pulse-withstanding capability of current sense resistors is a major parameter to be considered in LPS applications. Further, the ability of a resistor to withstand overload pulses is governed by several factors: the physical size of the resistor element, e.g., a chip resistor; the pulse duration and magnitude; and finally, the composition and formulation of the resistor element. The pulse magnitude and duration are critical parameters for the evaluation of withstanding characteristics of the resistor. A longer pulse duration results in a larger peak energy rating. Accordingly, a multi-purpose current sense resistor in accordance with the present invention provides adequate current-sensing ability while operating under normal conditions and provides a fuse-like function for protecting the POE circuitry from electrical overloads when certain, abnormal, conditions arise.

Specifically, a communication network in accordance with the present invention includes at least one communication device operable to transmit or receive communications over the network and a power sourcing device connected to the communication device via cabling. Further, the power sourcing device is operable to provide electrical power to the communication device and includes a multi-purpose element, which can be a resistor, operable to alternatively provide both a current sensing function, by which an amount of electrical current drawn by the communication device is determined, and a fault protection function by which the output of the communication device is disconnected during a predetermined fault condition.

Also, according to another aspect of the invention, the power sourcing device performs data communication with the communication device. Further, the predetermined fault condition can include a failure in a power switch and an overload condition in either or both of the communication device and the cabling connecting the communication device and the power sourcing device. The fault condition can also be an open circuit.

According to further aspects of the invention, the power sourcing device is protected in accordance with a published standard which is, for example, one of UL 60950, IEC 60950 and EN 60950 and the communication network can be configured in accordance with IEEE 802.3 or draft standard IEEE 802.3af.

The power sourcing device in accordance with the present invention can be an end-span PSE device in accordance with power over Ethernet (POE) technology or a mid-span PSE device in accordance with power over Ethernet (POE) technology.

In accordance with yet another aspect of the present invention, a communication network includes at least one communication device operable to transmit or receive communications over the network and a power sourcing device associated with the communication device and operable to provide electrical power to the communication device, wherein the power sourcing device includes a resistor means for providing a protection function by which the communication device is electrically protected from a fault condition. Further, the resistor can be a general-purpose resistor.

According to further aspects of the invention, the communication device and the power sourcing device comply with standard IEEE 802.3af, the multi-purpose element limits the electrical current drawn by the communication device from the power sourcing device in accordance with the published standard, and an amount of power drawn by the communication device is limited to 100VA.

A power sourcing device according to a further aspect of the invention includes a power switch operable to selectively provide power to the communication devices over a standard communication interface, which can be an Ethernet interface, a multi-purpose element operable to alternatively provide a current sensing function by which the amount of electrical current drawn by the communication device is determined and a protection function by which the communication device is electrically disconnected from the electrical power during a fault condition. Also, a control section is provided connected to the power switch and which is operable to selectively turn-on or turn-off the power switch. The control section is further operable to determine an amount of electrical current flowing through the multi-purpose element.

According to yet another aspect, the communication devices can be networked in a Local Area Network configuration adapted to accommodate Power Over Ethernet technology.

According to yet another aspect, the multi-purpose element is a surface mount resistor.

According to yet another aspect, the multi-purpose element is a general-purpose resistor.

According to yet another aspect, the power sourcing device complies with the limited power source (LPS) requirements specified in a published safety standard.

According to yet another aspect, the published standard is one of UL 60950, IEC 60950 and EN 60950.

DETAILED DESCRIPTION OF THE INVENTION

Figure 1:
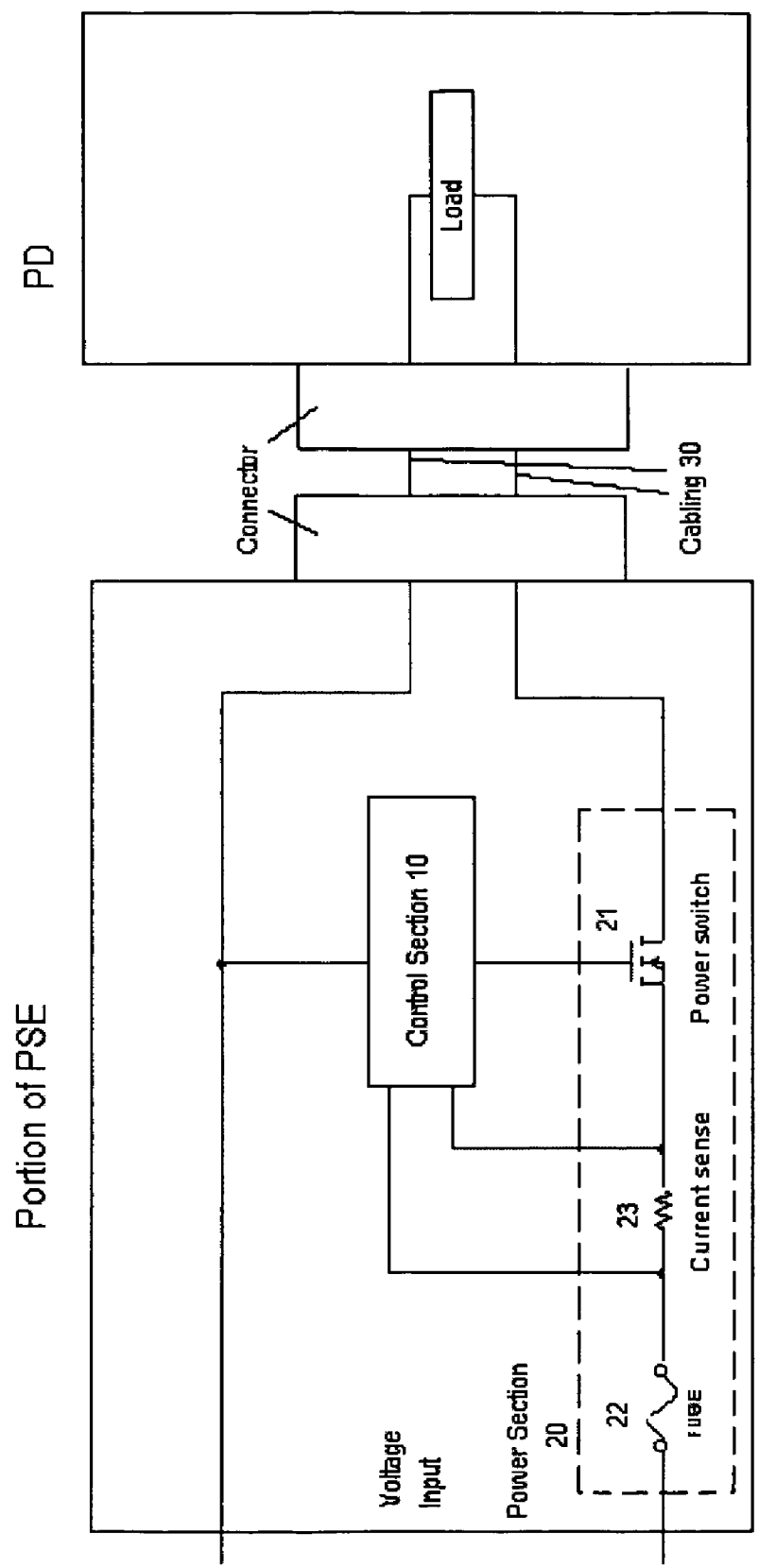
FIG. 1 is an illustration showing the relationship between a conventional PSE, using a traditional fuse and a load, e.g., a powered device (PD)
Figure 2:
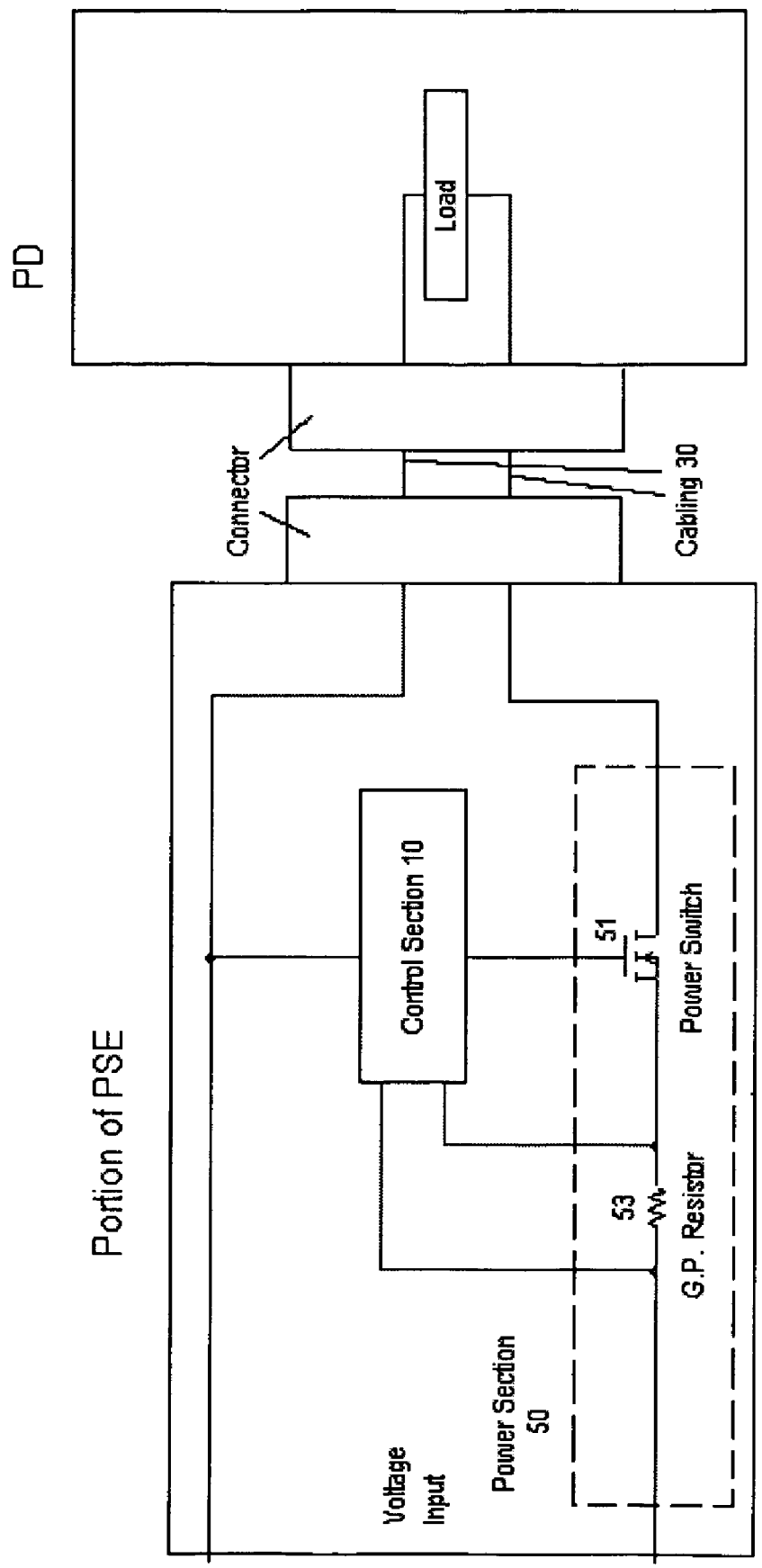
FIG. 2 is an illustration showing the relationship between a PSE, which dispenses with a fuse-like device, and a load, in accordance with the present invention.

In accordance with one embodiment of the invention, as shown in FIG. 2, a general purpose, for example an SMT (Surface Mount Technology) thick or thin film 2 Ohm '2010' size resistor 53, is used to perform both current sensing and circuit protection functions in a POE system, as opposed to the current sense element 23 and fuse 22 shown in the conventional system of FIG. 1. Under normal operating conditions, according to the standards governing POE devices, i.e., IEEE802.3af, the maximum continuous electrical current drawn by the load should not exceed 350 mA. Thus, the power dissipated by the resistor 53 while the load is drawing maximum current is calculated as follows:

$$P = I^2 \cdot R \quad \text{(EQN 1)}$$

$$P = (350 \text{ mA})^2 \cdot 2\Omega$$

$$P = 0.245 \text{ W},$$

which is within the safe operating area for a 0.75 W 2010 size resistor.

Further, the amount of energy that would dissipate on the 2 Ohm resistor in the case of a short circuit of the power switch, assuming Vout=48V and a load power of 100VA after 60 seconds of operation, is calculated as follows:

$$I = \frac{100}{48} \text{ (VA/V)} = 2.083 \text{ A} \quad \text{(EQN 2)}$$

$$E = P \cdot T = I^2 \cdot R \cdot T$$

$$E = (2.083\text{A})^2 \cdot 2\Omega \cdot 60 \text{ sec} = 520.83 \text{ Joules}$$

According to typical manufacturer's information regarding pulse limit power capabilities of general purpose SMT resistors, the maximum energy rating of a 2010 size resistor for a 60 second pulse is 132 Joules, well under the amount of energy that would be generated in the event of a short-circuit in the POE devices described above.

Specifically, as shown above, for example in Equation 2, the amount of energy dissipated in a typical 2 Ohm resistor is 4 times greater than the pulse capabilities of a 2010 general purpose resistor. As a result, a 2 Ohm 2010 resistor would disintegrate and 'open' the POE port a long time before the expiration of the 60 second window. Accordingly, a POE port with a current sense 2 Ohm 2010 resistor satisfies the requirements of safety agencies as an inherently limited power source (LPS).

As should be realized from reading the above description of the present invention, both end-span PSE and mid-span PSE configurations, in accordance with IEEE 802.3, can benefit by implementing a device in accordance with the invention. For example, in the end-span PSE configuration, using a single multi-purpose element, power drawn from the Ethernet switch directly through the data lines can be monitored and, in the event of a fault condition, prevented from violating the 100 VA maximum output requirement. Similarly, in the mid-span PSE configuration, by utilizing a multi-purpose element in accordance with the invention, power drawn from the "power hub" over inactive, or non-data carrying, wire pairs, is monitored and, in the event of a fault condition, prevented from violating the 100VA maximum output requirement.

Numerous tests were performed with resistors from three different manufacturers: Yageo, KOA Speer Electronics and TT Electronics. During the tests, the Main Switch was shorted and the load current was increased to 2A to simulate an overload condition and verify compliance with the 100VA maximum output power requirement. All resistors presented an "Open" condition within less than 10 seconds, thus satisfying the requirement that the multi-purpose current sensing resistor in accordance with the present invention operate as a typical current sense resistor under normal operating conditions, and a protection device, protecting the load, or PD, under abnormal, e.g., fault, conditions, such as a short-circuit.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method of providing power for at least one communication device in a communication network, the method comprising:
   providing at least one communication device operable to transmit or receive communications over the communication network;
   providing a power sourcing device, said provided power sourcing device being a limited power source;
   connecting the output of said provided power sourcing device to said provided at least one communication device via communication cabling;
   arranging said provided power sourcing device to comprise a general purpose resistor providing a current sensing function by which an amount of electrical current drawn by said provided at least one communication device via the communication cabling is sensed; and
   selecting a value for said general purpose resistor so as to further provide a fault protection function by which the output of said provided power sourcing device is disconnected during a predetermined fault condition.

2. A method according to claim 1, further comprising: powering said provided at least one communication device from said provided power sourcing device via the data ports of a switch.

3. A method according to claim 1, wherein the predetermined fault condition comprises a failure in a power switch of said provided power sourcing device and one of an overload and a short circuit condition in either or both of said provided at least one communication device and the communication cabling connecting said provided communication device and said provided power sourcing device.

4. A method according to claim 1, wherein the predetermined fault condition comprises an open circuit condition.

5. A method according to claim 1, wherein said provided power sourcing device is arranged as an end span power sourcing equipment.

6. A method according to claim 1, further comprising:
   sensing an amount of current drawn by said provided at least one communication device, said sensing being responsive to said general purpose resistor; and
   limiting the amount of current drawn by said provided at least one communication device via the communication cabling responsive to said sensing.

7. A method according to claim 1, further comprising:
   arranging said provided power sourcing device between a data switch and said provided at least one communication device.

8. A method according to claim 1, wherein said selected value limits the amount of current drawn by said provided at least one communication device via the communication cabling to 100 VA.

9. A method according to claim 1, wherein said general purpose resistor is a surface mount resistor.

10. A method of providing a protected limited power source, the method comprising:
providing a limited power source arranged and configured to provide power to at least one communication device over communication cabling;
configuring said provided limited power source to comprise a general purpose resistor exhibiting a voltage across the general purpose resistor proportional to an amount of current provided to the at least one communication device; and
selecting a value for said general purpose resistor so as to provide a protection function by which power provided to the at least communication device over communication cabling is interrupted in the event of a fault condition.

11. A method according to claim 10, wherein the predetermined fault condition comprises a failure in a power switch of said provided power sourcing device and one of an overload and a short circuit condition in either or both of the at least one communication device and the communication cabling connecting the at least one communication device and said provided limited power source.

12. A method according to claim 10, wherein the predetermined fault condition comprises an open circuit condition.

13. A method according to claim 10, wherein said provided limited power source is arranged as an end span power sourcing equipment.

14. A method according to claim 10, wherein said provided limited power source is arranged as a mid-span power sourcing equipment.

15. A method according to claim 10, further comprising:
sensing an amount of current provided to the at least one communication device, said sensing being responsive to said general purpose resistor; and
limiting the amount of current drawn provided to the at least one communication device responsive to said sensing.

16. A method according to claim 10, wherein said selected value limits the amount of provide to the at least one communication device to 100 VA.

17. A method according to claim 10, wherein said general purpose resistor is a surface mount resistor.

18. A method of providing power for at least one communication device in a communication network, the method comprising:
providing at least one communication device operable to transmit or receive communications over the communication network;
providing a power sourcing device, said provided power sourcing device being a limited power source;
connecting the output of said provided power sourcing device to said provided at least one communication device via communication cabling;
configuring said provided power sourcing device to comprise a general purpose resistor providing a current sensing function by which an amount of electrical current drawn by said provided at least one communication device via the communication cabling is sensed;
configuring said provided power sourcing device to comprise a power switch operable to selectively and controllably provide power to said provided at least one communication device via communication cabling; and
selecting a value for said general purpose resistor so as to further provide a fault protection function by which the output of said provided power sourcing device is disconnected during a predetermined fault condition.

19. A method according to claim 18, further comprising:
configuring said provided power sourcing device to comprise a control section operable to control said power switch; and
controlling, via the operation of said power switch by said control section, the amount of current drawn by said provided at least one communication cabling.

20. A method according to claim 18, further comprising:
powering said provided at least one communication device from said provided power sourcing device via the data ports of a switch.

21. A method according to claim 18, wherein the predetermined fault condition comprises a failure in the power switch and one of an overload and a short circuit condition in either or both of said provided at least one communication device and the communication cabling connecting said provided at least one communication device and said provided power sourcing device.

22. A method according to claim 18, wherein the predetermined fault condition comprises an open circuit condition.

23. A method according to claim 18, wherein said provided power sourcing device is arranged as an end span power sourcing equipment.

24. A method according to claim 18, further comprising:
arranging said provided power sourcing device between a data switch and said provided at least one communication device.

25. A method according to claim 18, wherein said selected value limits the amount of current drawn by said provided at least one communication device via the communication cabling to 100 VA.

26. A method according to claim 18, wherein said general purpose resistor is a surface mount resistor.

* * * * *